United States Patent Office 3,798,231
Patented Mar. 19, 1974

3,798,231
BIS-AROXAZOLYL-PARA-POLYPHENYLENES
Fritz Fleck, Bottmingen, Basel-Land, Hans Kittl, Riehen, Basel-Stadt, and Horst Schmid, Munchenstein, Basel-Land, Switzerland, assignors to Sandoz Ltd., Basel, Switzerland
No Drawing. Filed Oct. 5, 1971, Ser. No. 186,791
Claims priority, application Switzerland, Oct. 12, 1970, 14,971/70
Int. Cl. C07d 85/48
U.S. Cl. 260—307 D
11 Claims

ABSTRACT OF THE DISCLOSURE

Bis-aroxazolyl-para-polyphenylenes of the formula

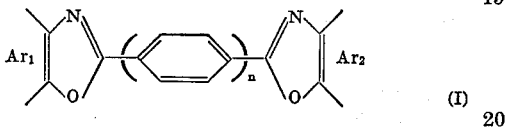
(I)

where
the value of $n$ is at least 3 but not greater than 8 and

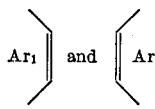

represent benzene or phenanthrene radicals which may be substituted and, if they are benzene radicals, each radical bears not more than one second-order (meta directing) substitutent, and, if $n$ has the value 3 the molecule contains at least one-second-order (meta-directing) substituent bound to one of the benzene radicals

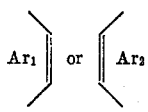

which are excellent brighteners for polyolefins, polyester or polyamides.

---

This invention relates to new bis-aroxazolyl-para-polyphenylenes of formula

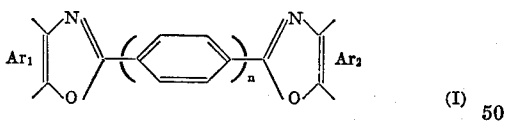
(I)

where
the value of $n$ is at least 3 but not greater than 8 and

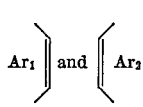

represent benzene or phenanthrene radicals which may be substituted and, if they are benzene radicals, each radical bears not more than one second-order (meta directing) substitutent, and, if $n$ has the value 3, the molecule contains at least one-second-order (meta-directing) substituent bound to one of the benzene radicals

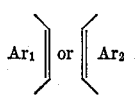

The process for the prouction of the new bis-aroxazolyl-para-polyphenylenes of Formula I comprises:
(a) Reacting in either order 1 mol of a dicarboxylic acid of formula

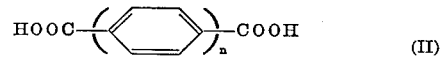
(II)

or of a functional derivative of this acid, with 1 mol of an ortho-aminohydroxy compound of formula

(III)

and 1 mol of an ortho-aminohydroxy compound of formula

(IV)

in the presence of an acid condensing agent at elevated temperature; or
(b) Acylating in either order 1 mol of an ortho-amino-halogen compound of formula

(V)

and 1 mol of an ortho-aminohalogen compound of formula

(VI)

where $Hal_1$ represents chlorine or preferably bromine, with 1 mol of a dicarboxylic acid of Formula II or of a functional derivative of this acid, with subsequent condensation in the presence of copper or a copper compound; or
(c) Reacting 1 mol of an aroxazolyl compound of formula

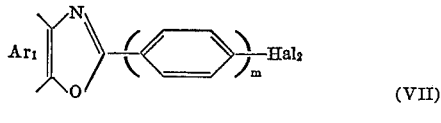
(VII)

and 1 mol of an aroxazolyl compound of formula

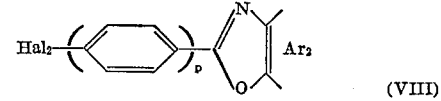
(VIII)

where $Hal_2$ represents iodine or bromine,
each of $m$ and $p$ has a value of at least 1,
and the sum of $m$ and $p$ has the value $n$,
with suitable metals, preferably in finely divided form; or
(d) Reacting compound of formula

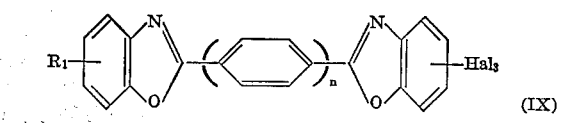
(IX)

where

Hal₃ stands for chlorine or preferably bromine or iodine, and R₁ for hydrogen, alkyl with 1 to 12 carbon atoms, alkoxy with 1 to 6 carbon atoms of Hal₃, with copper (I) cyanide; or (e) Sulphonating or sulphohalogenating a compound of Formula I in which the radicals

are unsubstituted or bear only first-order substituents, with conversion of the resulting sulphonic acid halide into an ester or an amide.

Given a value of 4 or more for $n$, the benzene radicals

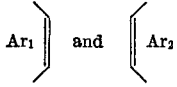

and consequently the ortho-aminohydroxybenzenes of Formulae III and IV and the ortho-amino-halogenobenzenes of Formulae V and VI on which they are based, may be unsubstituted or may bear first-order substituents (ortho-para directing), such as halogen atoms (chlorine, fluorine), unsubstituted, substituted, straight or branched alkyl groups having preferably 1 to 12 carbon atoms (methyl, ethyl, n-propyl, iso-propyl, n-, iso-, sec. and tert.butyl, n-, iso- and tert.amyl, n-hexyl, 2-ethylhexyl, n-octyl, tert.octyl, n-decyl, n-dodecyl, tert.dodecyl, 2-methoxyethyl, 2-ethoxyethyl, 2-n-butoxyethyl, 3-methoxypropyl, 3-methoxybutyl-1, benzyl, phenylethyl, phenoxyethyl), alkoxy groups having 1 to 6 or preferably 1 to 4 carbon atoms (methoxy, ethoxy, n-butoxy), unsubstituted or substituted cycloalkyl groups (cyclohexyl, 4-methylcyclohexyl), unsubstituted or substituted aryl radicals (naphthyl-1, naphthyl-2, phenyl, bromo-, fluoro- or chloro-phenyl, methylphenyl), second-order substituents such as the cyano, carboxylic acid or sulphonic acid group, carboxylic and sulphonic acid ester and amide groups, alkylsulphonyl and arylsulphonyl groups which may be further substituted.

Examples of carboxylic acid and sulphonic acid ester groups are the unsubstituted or substituted alkyl, cycloalkyl and aryl esters, of which alkyl contains preferably 1 to 8 carbon atoms and cycloalkyl and aryl are preferably mono- or di-nuclear. For further exemplification, the following carboxylic acid and sulphonic acid esters may be named: methyl, ethyl, n-propyl, iso-propyl, n-butyl, iso-butyl, tert.butyl, n-amyl, iso-amyl, n-hexyl, n-octyl, 2-ethylhexyl, β-methoxyethyl, β-ethoxyethyl, β-n-butoxyethyl, γ-methoxypropyl, δ-methoxybutyl, β-(β'-methoxyethoxy)-ethyl, β-(β'-ethoxy-ethoxy)-ethyl, β-(β'-n-butoxyethoxy)-ethyl, β-hydroxyethyl, β- and γ-hydroxypropyl, β-chlorethyl, β,β-difluorethyl, benzyl, β-phenylethyl, β-phenoxyethyl, cyclohexyl, 4-methylcyclohexyl, phenyl, 2-, 3- and 4-methylphenyl, 2- and 4-methoxyphenyl, 2- and 4-ethoxyphenyl, 2-, 3- and 4-chlorophenyl, 4-fluorophenyl, 4-ethylphenyl, 4-iso-propylphenyl, 4-n-butylphenyl, 4-tert.butylphenyl, 4-tert.amylphenyl, 2,4- and 2,5-dimethylphenyl, 2,4- and 2,5-dichlorophenyl, naphthyl-1, naphthyl-2 and 4-diphenylyl esters.

Examples of suitable unsubstituted or substituted carboxylic acid and sulphonic acid amide groups are alkyl, cycloalkyl and arylamide groups, of which alkyl contains preferably 1 to 8 carbon atoms and cycloalkyl and aryl are preferably mono- or di-nuclear. These amides include the carboxylic and sulphonic acid amides and methyl, ethyl, n-butyl, n-amyl, n-hexyl, 2-ethylhexyl, dimethyl, diethyl, β-hydroxyethyl, β- and γ-hydroxypropyl, di-(β-hydroxyethyl), di-(β- and γ-hydroxypropyl), β-methoxyethyl, β-ethoxyethyl, γ-methoxypropyl, benzyl, β-phenylethyl, β-phenoxyethyl, cyclohexyl, 4-methylcyclohexyl, phenyl, 2-, 3- and 4-methylphenyl, 2- and 4-methoxyphenyl, 2- and 4-ethoxyphenyl, 2-, 3- and 4-chlorophenyl, 4-fluorophenyl, 4-ethylphenyl, 4 - iso - propylphenyl, 4-n-butylphenyl, 4-tert.butylphenyl, 4-tert.amylphenyl, 2,4- and 2,5-dimethylphenyl, 2,4- and 2,5-dichlorophenyl, N-methyl-N-phenyl, N-ethyl-N-phenyl, N-β-hydroxyethyl-n-phenyl, naphthyl-1-, naphthyl-2- and 4-diphenylyl amides.

The alkylsulphonyl group may contain 1 to 8 carbon atoms. The arylsulphonyl group is preferably mononuclear and is usually phenyl, substituted if desired by lower alkyl or alkoxy groups with 1 to 6 carbon atoms or by chlorine or fluorine atoms. Examples of such groups are n-hexylsulphonyl, n-amyl- and iso-amylsulphonyl, n-butyl- and iso-butyl-sulphonyl, n-propyl- and iso-propyl-sulphonyl, and in particular ethylsulphonyl, methylsulphonyl, phenyl sulphonyl, 2- and 4-methylphenylsulphonyl, 2- and 4-methoxy- and 2- and 4-ethoxy-phenylsulphonyl, 4-chlorophenylsulphonyl, 4-fluorophenylsulphonyl, 4-ethyl-, 4-iso-propyl-, 4-n-butyl-, 4-tert.butyl-, 4-tert.amyl-, 4-iso-propoxy- and 4-n-butoxyphenyl-sulphonyl.

Each of the benzene nuclei may also bear two different substituents such as a halogen atom and an alkyl group or an alkyl group and an alkoxy group.

The following are examples of suitable 2-amino-1-hydroxy-benzene: 1-amino-2-hydroxybenzene, 1-amino-2-hydroxy-alkylbenzenes whose alkyl groups are straight or branched and which may have 1 to 12 carbon atoms, e.g. 1-amino-2-hydroxy-5-methyl-, -5-tert.butyl- and -5-tert.octylbenzene, 1-amino-2-hydroxy-aralkylbenzenes, 1-amino-2-hydroxy-phenylbenzeness in which the phenyl radical may bear further substituents, 1-amino-2-hydroxy-dialkylbenzenes in which each alkyl radical has preferably not more than 5 carbon atoms, 1-amino-2-hydroxychloro- and -fluorobenzenes, 1-amino - 2 - hydroxy-alkoxybenzenes in which the alkoxy group has preferably not more than 4 carbon atoms, e.g. 1-amino-2-hydroxy-4-methoxy- and -5-methoxybenzene, 1-amino - 2 - hydroxy-alkyl-alkoxybenzenes in which each alkyl and alkoxy radical contains preferably not more than 4 carbon atoms, e.g. 1-amino-2-hydroxy-4-methoxy-5-methylbenzene, 1-amino-2-hydroxy-dialkoxybenzenes in which each alkoxy group contains preferably not more than 4 carbon atoms, e.g. 1-amino-2-hydroxy-4,5-dimethoxybenzene.

Two vicinal positions of the benzene nucleus may be bound through an aliphatic chain such as a tetramethylene chain or a —CH=CH—CH=CH— chain, as in 1-amino-2-hydroxy-5,6-tetramethylene-benzene.

If $n$ has the value 3, at least one of the benzene radicals

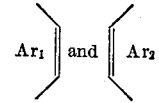

bears a second-order substituent and each of the benzene radicals bears not more than one second-order substituent and may bear other substituents such as alkyl, alkoxy or halogen.

The preferred aminohydroxyphenanthrene is 9-amino-10-hydroxy-phenanthrene.

The aminohydroxy compounds of Formulae III and IV can be employed as such or in the form of their salts, for example the hydrochlorides.

The suitable dicarboxylic acids of Formula II include 4,4″ - para-terphenylene-dicarboxylic, 4,4‴-para-quaterphenylene-dicarboxylic, 4,4⁗-para - quinquephenylene-dicarboxylic and 4,4‴‴ - para-sexiphenylene-dicarboxylic acid.

The suitable fuctional derivatives of these acids include the nitrile, halide, anhydride, amide and ester groups. Of the ester groups, those derived from lower aliphatic alcohols such as methyl and ethyl alcohol are of special importance.

The two acid functions may be identical or different; accordingly the compounds with an ester and an acid group, or with a nitrile and an acid group, or with an ester and an amide group, or with an ester and an acid chloride group or with a nitrile and an acid chloride group, or with an amide and an acid chloride group can be employed.

The dicarboxylic acids of Formula II or their functional derivatives are reacted with the ortho-aminohydroxy compounds of Formulae III and IV at 50–350° C., preferably in the presence of an organic solvent at 100–300° C. or more especially 150–250° C., and with advantage in an inert gas atmosphere, for example nitrogen. The two temperature ranges given, 50–350° C. and 100–300° C., do not imply that the reaction can be carried through to the end-point at 50° C. or 100° C. or that the reactants are brought together at 300° C. or 350° C., but that the starting materials are mixed and the reaction initiated at the lower temperature of the given range.

To bring the cyclizing reaction to completion it is advisable to work at the lowest temperature permitted by the catalyst employed, which is 100° C. in the case of polyphosphoric acids in excess of the theoretically necessary amount. Examples of suitable acid condensing agents are boric acid, boric anhydride, boron trifluoride, zinc chloride, polyphosphoric acids, aromatic and aliphatic sulphonic acids such as benzene-, 4-methylbenzene-, methane- and ethane-sulphonic acid.

If boric acid, zinc chloride or one of the named sulphonic acids is selected as condensing agent they are best used in catalytic amounts, i.e. in amounts of 0.5–10% relative to the total weight of the reactants. If the amount is smaller, e.g. 0.1%, the rate of reaction is considerably slower, while amounts greater than 10% do not produce any noticeable improvement. It is advantageous to react in the presence of an inert solvent of high boiling point, e.g. ortho-dichlorobenzene, trichlorobenzene, nitrobenzene, diethyl-, di-n-butyl- or dioctyl-phthalate, di- or tri-ethylene glycol, di- or tri-propylene glycol, diethylene glycol diethylether or dibutylether, diphenyl, diphenyl oxide, tetrahydronaphthalene, trimethyl-, triethyl-, tetramethyl- and tetraethyl-benzene, tetramethylene sulphone, or mixtures of these solvents.

If the dicarboxylic acids of Formula II are used as such it is advisable to add 0.1 to 1 equivalent of a tertiary saturated nitrogen base per carboxyl group. Suitable tertiary saturated nitrogen bases include aliphatic amines (trimethylamine, triethylamine, tri-n-butylamine, tri-isobutylamine), N,N-dialkylaminobenzenes (N,N-dimethylamino- and N,N-diethylamino-benzene), heterocyclic amines (pyridine, methylpyridines, quinoline, iso-quinoline, mixtures of pyridine bases, N-methyl-, N-ethyl- and N-n-butyl-piperidine). Preferably pyridine or mixtures of pyridine bases are used.

For producing compounds of Formula I with a symmetrical structure, i.e. compounds in which the two aroxazolyl rings are identical, the reaction is best carried out so that 1 mol of a compound of Formula II is condensed with 2 mols of a compound of Formula III or IV, i.e. in the molar ratio of 1:2 or in a ratio differing only slightly from this.

To produce compounds of Formula I in which the radicals

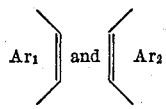

are different the condensation reaction can be carried out as a single operation. Alternatively, a compound of Formula II or one of its functional derivatives can be condensed first with an ortho-aminohydroxy compound of Formula III or IV to a para-aroxazolyl-polyphenylene-carboxylic acid or one of its functional derivatives, and this cyclized with an ortho-aminohydroxy compound of Formula III or IV to a compound of Formula I. The three reactants (a compound of Formula II, an ortho-aminohydroxy compund of Formula III and an ortho-aminohydroxy compound of Formula IV are used in the optimum molar ratio of 1:1:1 or in a ratio only slightly different from this.

In the reaction of compounds of Formula II with the orthoaminohydroxy compounds of Formula III and/or Formula IV acyl derivatives of ortho-aminohydroxy compounds such as the esters and/or amides are invariably formed in the first stage. The reactants and the reaction conditions can be chosen so that these esters and/or amides are isolated and cyclized in a second stage to give compounds of Formula I. If the reaction is carried out in two separate stages, the first stage (acylation) can be carried out at 80–200° C. and an inert organic solvent with boiling range 80–180° C. can be used, such as benzene, toluene, xylene, chlorobenzene, bromobenzene or ortho-dichlorobenzene. But the intermediately formed products need not necessarily be isolated; it is more convenient to choose reaction conditions enabling acylation and ring closure to be effected in one operation.

The compounds of Formula I can be isolated by various methods, for instance by partial distillation of the solvent, if necessary with vacuum, after which the product is allowed to crystallize, or by elimination of the solvent with vacuum or by steam distillation, or again by dilution with a suitable solvent such as petroleum ether or a lower alcohol. The isolated compound is filtered with suction, washed if necessary and dried.

The reaction of a dicarboxylic acid of Formula II or one of it functional derivatives with an ortho-aminohalogeno compound of Formula V and an ortho-aminohalogeno compound of Formula VI leads initially to a diamide of formula

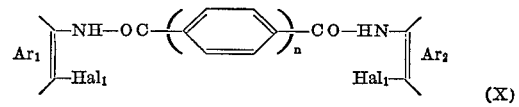

(X)

this acylation is carried out under the same conditions as the acylation of the ortho-aminohydroxy compounds of Formulae III and IV.

The cyclizing reaction yielding the bis-oxazolyl compound of Formula I is carried out in the presence of copper or a copper compound as catalyst, preferably in a liquid medium which may be set with an acid-binding agent. The optimum temperature range is 100–200° C. The catalyst may be a commercial copper powder, but it is preferable to use a finely divided copper as obtained by the reaction of metallic lead or zinc with a copper (II) compound such as copper (II) acetate, chloride or sulphate. The suitable copper compounds are copper (II) acetate, chloride and sulphate and copper (I) compounds such as copper (I) chloride.

Inert organic solvents can be used as reaction media, such as hydrocarbons, halogenated or nitrated hydrocarbons, petroleum fractions of high boiling point, xylene mixtures, chlorobenzene, ortho-dichlorobenzene, trichlorobenzene, nitrobenzene, bromobenzene, naphthalene, tetrahydronaphthalene, decahydronaphthalene, diphenyl, diphenyloxide, ethers such as methoxy- and ethoxy-benzene, bis-(2 - ethoxyethyl)-ether, bis-(n - butoxyethyl)-ether, bis-[2-(2'-methoxyethoxy)-ethyl]-ether, bis-[2-(2'-ethoxyethoxy)-ethyl]-ether, bis - [2-(2'-n-butoxyethoxy)-ethyl]-ether, amides such as dimethylformamide, dimethylacetamide, pyrrolidone, N-methyl-pyrrolidone, phosphoric acid tris-(dimethylamide), sulphones such as tetramethylene sulphone.

The choice of acid-binding agents suitable for neutralizing the hydrogen chloride or hydrogen bromide freed in the reaction includes the alkali-metal salts of weak organic and inorganic acids such as sodium and potassium acetate, sodium and potassium carbonate, and in particular amines of the aliphatic series such as n-butylamine, di-(n - butyl)-amine, tri-(n - butyl)-amine, triethylamine, amines of the aliphatic-aromatic series such as dimethylamino- and diethylaminobenzene, and of the heterocyclic series such as pyridine, quinoline, mixtures of pyridine bases, picolines and lutidines. If the tertiary amines are employed in great excess they can serve both as solvents or reaction media and as acid-binding agents.

The reaction can however be carried out without an acid-binding agent or in the presence of a complex salt, e.g. the salt of a copper compound and ammonia or pyridine, such as a cupric ammonium acetate or cupric pyridinium sulphate.

If an inorganic acid-binding agent is used or no such agent is added to the medium, cyclization proceeds at 150 to 200° C., while in the presence of a basic organic substance such as pyridine temperatures ranging from 100 to 150° C. are employable.

In the third mode of operation for producing the bis-aroxazolyl-para-polyphenylenes of Formula I the aroxazolyl compounds of Formula VII or VIII may be identical or different as desired. Hal$_2$ may stand for chlorine, but the preferred meanings are bromine and iodine.

The metals suitable for the reaction with the aroxazolyl compounds of Formulae VII and VIII include sodium, potassium, magnesium, silver and copper, the last named being preferred. The metal is employed in a fine state of division, normally as a powder, though magnesium which reacts readily with aryl halides can be used in powder form or as metal turnings.

For the reaction with copper the optimum temperature range is 200–300° C., more specifically 200–270° C. when Hal$_2$ stands for iodine and preferably above 250° C. when Hal$_2$ signifies bromine. It is convenient to omit solvent under these conditions and work in the melt, but if the melt needs to be diluted an inert solvent can be added, such as one of those used for cyclization. Mineral oils and ethers of high boiling point are other very suitable solvents, examples being di-n-octylether, di-(2-ethylhexyl)-ether, dibenzyl ether, preferably diphenyl ether, or a mixture of 73% diphenyl ether and 27% diphenyl. Alternatively pure dry sand can be used as diluent. As a rule condensation is carried out at normal pressure with mechanical stirring of the melt.

The most suitable condensing agent is metallic copper, which is normally used as so-called copper bronze. Its effectiveness can be increased by adding a trace of mercury or by treatment with iodine (cf. Kleiderer, J. Am. Chem. Soc. 55, 4225 (1933)). The copper is preferably used in excess, e.g. in an amount two to five times greater than the theoretical amount. The reaction times with copper are 2 to 20 hours, preferably 5–10 hours.

The reaction with silver is carried out in the same way. If a sodium or potassium salt is used, it is advisable to condense at high temperature using one of the aforenamed inert solvents or diluents.

The condensation products can be isolated as given above. If sand is used as inert reaction medium the compound of Formula I can be separated from the sand in liquid form, e.g. by filtration through a sieve which retains the sand only, or after the addition of a suitable solvent by filtration of the solution, or again by extraction with a suitable solvent.

If magnesium is chosen as condensing agent, the best course is to convert the two compounds of Formulae VII and VIII into the magnesium halide derivatives first. This is accomplished in an inert solvent free from water and acid, e.g. an ether such as diethyl, di-iso-propyl, di-iso-amyl or di-n-butyl ether, tetrahydrofuran, a tertiary amine such as pyridine, quinoline, N,N-dimethylaminobenzene or N,N-diethylaminobenzene, or in a hydrocarbon such as benzene or toluene, preferably in mixture with an ether or a tertiary amine. The addition of iodine in catalytic amounts or of an iodine-activated magnesium salt at the outset of the reaction can considerably shorten the induction time. In place of pure magnesium, an alloy such as a copper-magnesium alloy can be used. The optimum temperature range is −10° to 100° C., more especially 0–50° C.

The magnesium halide compounds are decomposed by adding an anhydrous silver or copper halide, preferably AgCl, AgBr, CuCl$_2$ or CuBr$_2$, leading to separation of metallic silver or copper (I) halide and formation of a direct linkage between the terminal phenyl nuclei according to the diagram

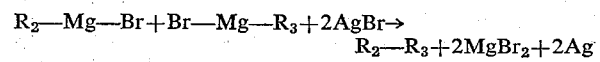

or

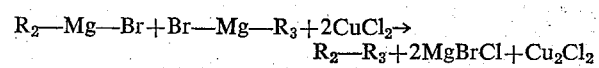

where R$_2$ and R$_3$ represent aryl radicals such as phenyl or naphthyl radicals. This is carried out in the temperature range given above for the production of the magnesium halide compounds.

If the bis-benzoxazolyl-para-polyphenylenes are in solution in the reaction medium they can be isolated by filtering off the finely divided silver with suction, shaking the filtrate for extraction, first with an acid to remove the magnesium chloride and then with water, and evaporating the solution to a small volume. If the compound of Formula I is wholly or partly insoluble in the reaction medium, the solvent or diluent can be removed first, the residue washed with an acid and then with water to remove the magnesium halide, then dried and extracted with a suitable solvent. This second method is suitable when CuCl$_2$ or CuBr$_2$ is employed.

The reaction of the halogen compounds of Formula IX with copper (I) cyanide is best carried out in an organic solvent at about 120° to 250° C., preferably at 100–160° C. when Hal$_3$ stands for iodine, or at 150–240° C. when Hal$_3$ stands for chlorine or bromine. Examples of suitable solvents are tertiary heterocyclic amines such as pyridine, mixtures of pyridine bases, picolines, quinoline; amides such as dimethyl formamide, dimethyl acetamide, pyrrolidone, N-methyl-pyrrolidone, tetramethyl urea, phosphoric acid tris-(dimethylamide), sulphoxides and sulphones such as dimethyl sulphoxide and tetramethylene sulphone.

The product can be isolated by filtering the hot or cooled reaction mixture with suction, if necessary after dilution with an agent which has no appreciable solvent action on the product, or after distillation of the solvent, preferably at reduced pressure or with water vapor. On isolation it is freed from the copper salts by treatment with an acid iron (III) salt solution at about 50–70° C. or with a 10% alkalimetal cyanide solution at room temperature or with a solution of ammonia or mono-, di- or tri-ethanolamine at 20–80° C. This is followed by filtration with suction, washing with water and drying. Alternatively the reaction mixture can be run straight into an acid iron (III) salt solution or an alkali-meatl cyanide solution and the precipitate isolated, or it can be poured into an acid solution and the precipitate filtered with suction, washed, treated with an ammonia or amine solution to remove the copper salts, filtered again with suction, washed and dried.

The water insoluble compounds can be converted into water soluble compounds by treatment with a sulphonating agent, e.g. sulphuric acid of 90–100% strength, weak oleum containing up to 30% SO$_3$ chlorosulphonic acid or gaseous SO$_3$, at 0° at about 100° C., preferably at 20° to 50–60° C. Treatment is continued until the number of sulphonic acid groups necessary for water solubility has been introduced. If chlorosulphonic acid or gaseous SO$_3$ is used, sulphonation is best carried out in an inert solvent such as sulphuric acid, orthodichlorobenzene or nitrobenzene; if concentrated sulphuric acid or oleum is chosen it serves both as sulphonating agent and solvent.

To introduce the sulphonic acid ester or amide groups it is advisable to introduce first one or more sulphonic acid halide groups, preferably sulphonic acid chloride groups, by treatment of the unsulphonated or weakly sulphonated compound in an inert solvent such as nitrobenzene or preferably chlorosulphonic acid in excess at 0° to 100° C., preferably about 20° to 80° C. The newly introduced groups are then reacted with ammonia, primary or secondary amines, lower alcohols, e.g. with 1 to 8 carbon atoms, or phenols, preferably of the benzene series. The reaction with ammonia, primary or secondary amines can be carried out at 0° to 100° C. in an aqueous, aqueous-organic or organic medium with solvents which are inert to the $SO_2$-Hal groups under the reaction conditions, e.g. lower alcohols (methanol, ethanol, iso-propanol), ethers (diethylether, di-iso-propylether, dioxan, 1,4-dimethoxyethane, 1,2-diethoxyethane, methoxy- or ethoxy-benzene), ketones (acetone, methylethyl ketone), halogenated alkanes (methylene chloride, chloroform), hydrocarbons, halogenated and nitrated hydrocarbons (benzene, toluene, xylene, chlorobenzene, nitrobenzene), or an excess of the amine if it is liquid at the reaction temperature (aniline, cyclohexylamine, benzylamine, ethylamine, diethylamine, ethanolamine, diethanolamine, morpholine etc.). This reaction is carried out e.g. at 0° to about 60° C. in an aqueous, aqueous-organic or organic medium in the presence of an acid-binding agent when aliphatic amines or ammonia are used, or at 50–100° C. in aqueous medium, either in the presence of an acid-binding agent or in the amine itself if aromatic amines are used (cf. Houben-Weyl, Methoden der Organischen Chemie, vol. IX, pp. 606–615 (1955)).

The reaction with alcohols (methanol, ethanol, n-butanol, n-pentanol, 2-ethylhexanol, cyclohexanol, benzyl alcohol, 2-methoxy-, 2-ethoxy- or 2-n-butoxy-ethanol, tetrahydrofurfuryl alcohol) or with phenols (phenol itself, 2-, 3- or 4-methyl- or -chlorophenol, 4-isopropyl-, 4-tert.butyl-, 4-tert.amyl- or 5-tert.octylphenol) can be carried out in the temperature range of 0° to 180° C., e.g. in the alcohol itself without acid-binding agent by heating at 60° C. to 150° C., if necessary with reflux, or in the presence of an alkali-metal hydroxide or alcoholate or a tertiary amine such as pyridine at 0° to 30–40° C.; when phenols are used, an aqueous medium containing an alkali-metal hydroxide can be employed and the reaction carried out at room temperature to 100° C., preferagly 50–80° C., or in pyridine at 0–60° C. (cf. Houben-Weyl, Methoden der Organischen Chemie, vol. IX, pp. 664–673 (1955)).

To introduce the sulphonic acid halide groups the compounds, which already contain sulphonic acid groups, e.g. in the form of alkali-metal salts, can be reacted with phosphorus halides such as phosphorus oxychloride or pentachloride or with a mixture of chlorine and phosphorus trichloride, if necessary in the presence of an inert solvent, at 60–180° C., or in an excess of chlorosulphonic acid or fluorosulphonic acid at room temperature to about 100° C. (cf. Houben-Weyl, Methoden der Organischen Chemie, vol. IX, pp. 564–579 (1955)).

Interesting compounds of Formula II are of formula

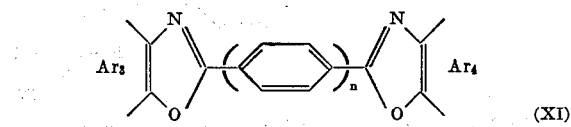

(XI)

where $n$ stands for a whole number from 3 to 8,

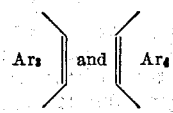

each stands for a phenanthrene radical of formula

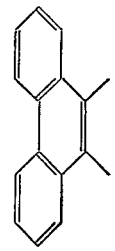

or each for a benzene radical which may contain one or two first-order substituents (ortho-para directing) selected from the series of chlorine and fluorine atoms, alkyl groups having 1 to 12 carbon atoms, alkoxyalkyl groups having in all 3 to 7 carbon atoms, alkoxy groups having 1 to 6 carbon atoms, phenylalkyl groups having not more than 2 carbon atoms in the alkyl radical, the phenoxyethyl, cyclohexyl, methylcyclohexyl, phenyl, halogenophenyl or methylphenyl groups, and/or a single second-order substituent selected from the series of the cyano, carboxylic acid and sulphonic acid groups, the carboxylic acid phenyl ester, alkyl ester, amide, monoalkylamide, dialkylamide or phenylamide groups, the sulphonic acid phenyl ester, alkyl ester, amide, monoalkylamide, dialkylamide or phenylamide groups, the alkylsulphonyl and phenylsulphonyl groups, of which alkyl contains 1 to 8, preferably 1 to 4 or more specifically 1 or 2 carbon atoms, and when $n$ has the value 3, at least one of the benzene radicals

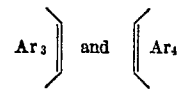

bears a second-order substituent.

Especially valuable compounds are those of formulae

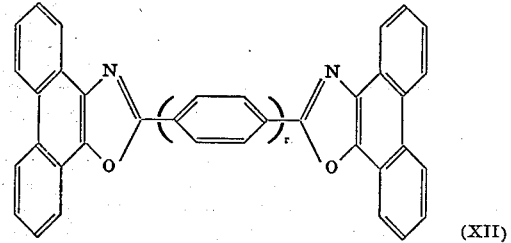

(XII)

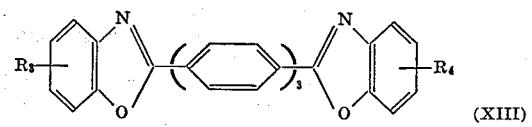

(XIII)

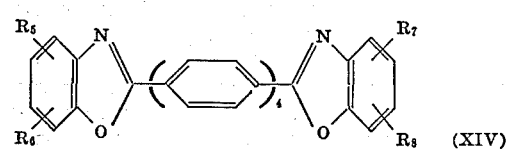

(XIV)

where $r$ stands for the number 3 or 4, $R_3$ and $R_4$ each stands for a cyano, carboxyl, aminocarbonyl or alkoxycarbonyl group with 1 to 4 carbon atoms in the alkoxy radical, $R_5$ and $R_7$ each stands for a hydrogen atom, an alkyl or alkoxy group having 1 to 4 carbon atoms or a cyano, carboxyl, aminocarbonyl or alkoxycarbonyl group having 1 to 4 carbon atoms in the alkoxy radical, and $R_6$ and $R_8$ each for a hydrogen atom, an alkyl group having 1 to 4 carbon atoms, or where $R_5$ and $R_6$ together and $R_7$ and $R_8$ together form a —CH=CH—CH=CH— chain.

In comparison with the nearest comparable compounds disclosed in the published Japanese patent application 18,750/70 (cf. Derwent Japanese Patents Report, vol. R, No. 26–27, p. 3 (1970)), the bis-phenanthroxazolyl-terphenylenes and bis-benzoxazolyl-terphenylenes with a meta-directing substituent produced in accordance with this invention, are notable for substantially greater optical brightening power in synthetic polymers, in particular in polyamides and polyesters. The bis-benzoxazolyl-quaterphenylenes have a stronger brightening action, are less volatile, faster to light and to washing than the corresponding terphenylenes. It is known that by lengthening the conjugation the position of the absorption maximum, and accordingly the fluorescence maximum, is shifted towards the long-wave region. It was therefore surprising that compounds produced in conformity with this invention in which $n$ has the value 4 show red-violet fluorescence and have a red-violet shade of excellent light fastness in synthetic polymers. The fact that second-order substituents in the benzoxazolyl radical would increase the effectiveness as brighteners was not foreseeable, because normally first-order substituents intensify the fluorescence.

The compounds of Formula I are highly effective as optical brighteners, both alone and in combination with other brighteners of any given constitution showing bluish or greenish fluorescence, with which they can be applied in any desired proportions. They cause an unexpectedly pronounced shift of the fluorescence shade to red.

With these properties the compounds are excellent for brightening organic materials, in particular fibre-forming polyesters, polyamides, polyurethanes, polyolefins (polyethylene, polypropylene), polyvinyl acetate, polyvinyl chloride, polyvinylidene chloride, polyacrylonitrile, modified polyacrylonitrile, cellulose acetate, cellulose triacetate and polystyrene.

The stated materials may be present in any of the forms occurring in production and processing when the disclosed compounds are added. The new brighteners can thus be incorporated in the monomers or prepolymers prior to synthesis of the final polymer, in the polymer melt in the course of the polymerization reaction, in moulding materials for the production of films, sheets or other moulded products, and in spinning melts and solutions for fibre production.

The brighteners can be applied to textile yarns and fabrics from solution in a solvent or from fine dispersion in water or other suitable medium. For polyester and polyester blend fabrics, however, the most satisfactory method of application is padding with an aqueous dispersion followed by intermediate drying and dry heat treatment for fixation of the brightener.

Further, the brightener compounds of Formula I can be fixed on a solid carrier material present in a fine state of division and employed in this form for the optical brightening of other substrates.

The amounts employed range from 0.001 to 0.5% relative to the weight of the material for brightening.

The disclosed compounds can be applied alone or in combination with other brighteners, and from aqueous dispersion in the presence of chemical bleaching agents and surface-active agents such as detergents and carriers.

The optical brighteners produced in conformity with this invention exhibit neutral blue to violet-blue fluorescence in organic materials, giving white effects of outstanding quality. They are notable for light fastness, heat stability and stability to bleaching agent solutions.

In the following examples, which illustrate the invention without limiting its scope, the parts unless otherwise stated are by weight and the percentages likewise. The temperatures are in degrees centigrade. The melting points are uncorrected. The parts by volume relate to the parts by weight as millilitres to grammes.

EXAMPLE 1

A mixture of 35.5 parts of para-terphenylene-4,4″-dicarboxylic acid chloride, 49.1 parts of 9-amino-10-hydroxyphenanthrene and 32.5 parts by volume of pyridine in 1000 parts by volume of chlorobenzene is reacted for 2 hours at 130° with stirring in the absence of air. During cooling 500 parts by volume of methanol are added to the mixture. The product settles out and when the temperature reaches 0–10° it is filtered with suction and dried.

The product, along with 10 parts of boric acid, is added to a mixture of 500 parts by volume of dibutyl phthalate and 100 parts by volume of diethylene glycol. The mixtuer is reacted for 2 hours at 240–250° with stirring, the water of reaction and the diethylene glycol being continuously distilled in a descending cooler. The mixture is then raised to 290–300° and stirred for a further 4 hours. After cooling to about 80° 500 parts by volume of benzene are run in. The mixture is cooled further to room temperautre with stirring and the precipitated product isolated by filtration with suction, dried and crystallized from 1,2,4-trichlorobenzene with the aid of bleaching earth.

A crystalline compound of lemon color having the formula

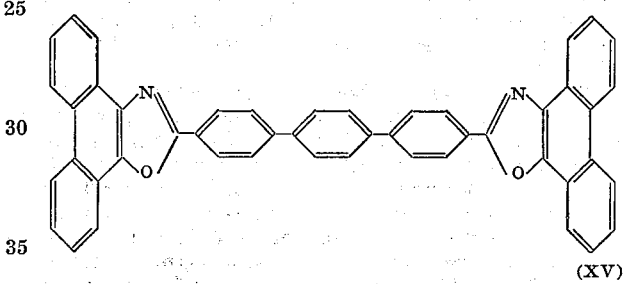

(XV)

is obtained in a yield of 30 parts. It decomposes at 450° and shows reddish blue fluorescence in chlorobenzene solution ($\lambda_{max.}$ 377 nm., E (extinction)=8).

EXAMPLE 2

A mixture of 35.5 parts of para-terphenylene-4,4″-dicarboxylic acid chloride and 50.2 parts of 1-amino-2,4-dibromobenzene (M.P. 75–78°) in 800 parts by volume of ortho-dichlorobenzene (dried with basic aluminum oxide) is reacted for 20 hours at boiling temperature with reflux in the absence of atmospheric oxygen. After this time 200 parts by volume of the solvent are distilled and the mixture cooled to 0–10°. Suction is applied to isolate the pale brown precipitate, which is washed with alcohol, dried at 80° with vacuum and crystallized two times from 1,2,4-trichlorobenzene.

The compound of formula

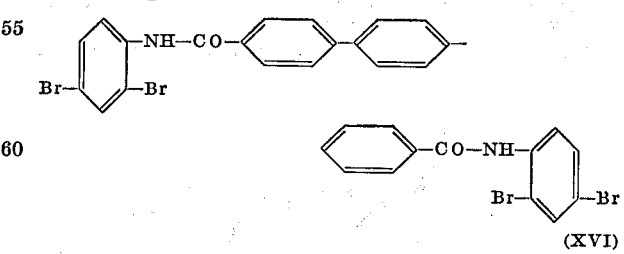

(XVI)

is obtained in the form of ochre-colored crystals with melting point 316–319°, the yield being 72 parts or 92% of theory.

A mixture of 16 parts of anhydrous copper (II) sulphate, 650 parts by volume of freshly distilled N-methyl-pyrrolidone and 160 parts by volume of freshly distilled pyridine is stirred for 30 minutes at 80°, after which 72 parts of the purified compound of Formula XVI and 3.3 parts of zinc dust are added. The blue-green suspension is stirred for 24 hours at about 150°, during which time it changes color to dark brown. After subsequent cooling to about 0° and filtration with suction a brown powder is obtained. This is stirred into 400 parts by volume of concentrated ammonia, filtered again with suction, washed with water and acetone, and vacuum dried at 80°. The pale brown powder is recrystallized from 1,2,4-trichlorobenzene with the aid of bleaching earth. An ochre-colored compound is obtained which melts at 330–335° and has the formula

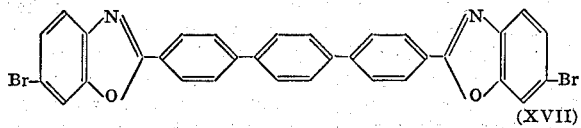

(XVII)

The 35.2 parts of the purified compound of Formula XVII obtained as above together with 15.2 parts of copper (I) cyanide are added to 800 parts by volume of freshly distilled quinoline. The suspension is reacted from 24 hours at 235° with stirring and reflux. On cooling to room temperature it is stirred into semi-concentrated hydrochloric acid. The reaction product is filtered with suction, washed with water, treated with concentrated ammonia solution, washed with water and then with acetone and vacuum dried at 80°. The resulting 30 parts of a pale brown powder are recrystallized from 1,2,4-trichlorobenzene with the aid of bleaching earth. The lemon-colored compound, melting point >360°, fluoresces in chlorobenzene solution with a violet shade. It has the formula

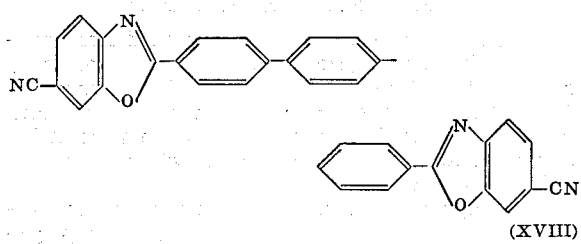

(XVIII)

The same compound can be produced in analogy with Example 1 by condensation of para-terphenylene-4,4''-dicarboxylic acid dichloride with 4-amino-3-hydroxybenzoic acid (prepared by reduction of the corresponding nitro compound, cf. Beilstein, Organische Chemie, vol. 10, p. 146 (1927)) to the dicarboxylic acid of formula

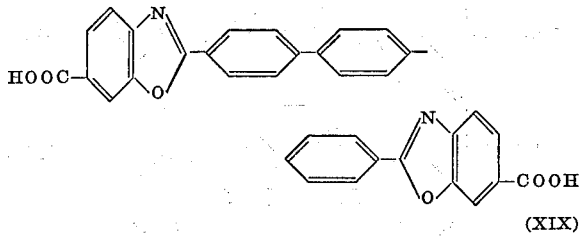

(XIX)

which itself can be used as a polyester brightener, followed by conversion of the COOH groups into CN groups by treatment with urea and aminosulphonic acid.

The dicarboxylic acid in Formula XIX or the isomeric dicarboxylic acid of formula

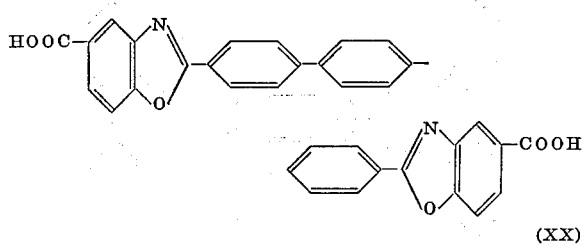

(XX)

produced in the same manner can be treated with an alcohol (methanol, ethanol, n-butanol) and concentrated sulphuric acid to yield the corresponding esters, in which the COOH groups are replaced by $COOCH_3$, $COOC_2H_5$ or $COO$-n-$C_4H_9$ groups. These esters also are valuable brighteners of high melting point for polyester fibres in which they show a violet fluorescence shade.

EXAMPLE 3

By replacing the 1-amino-2,4-dibromobenzene used in Example 2 by the equivalent amount of 1-amino-2,6-dibromobenzene (Beilstein $12^2$, 357, M.P. 87–88°), via analogous intermediate compounds a pale yellow compound of formula

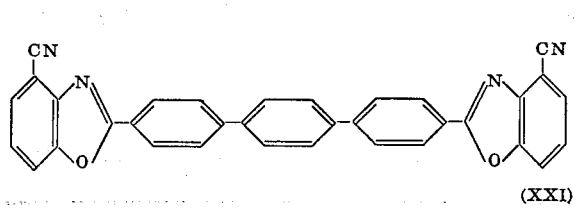

(XXI)

is formed. This compound shows violet fluorescence in organic solvents. It is more highly soluble in 1,2,4-trichlorobenzene than the isomeric compound of Formula XVIII and has its absorption maximum in this solvent at 357 nm.

EXAMPLE 4

A mixture of 34.2 parts of 4-iodobiphenyl-4'-carboxylic acid chloride, 16.5 parts of 1-amino-2-hydroxy-5-tert. butylbenzene and 2 parts of boric acid in 150 parts by volume of anhydrous ortho-dichlorobenzene is raised to 180° in 1½ hours with stirring under a nitrogen atmosphere. The mixture is held for 3 hours at this temperature, cooled to room temperature and diluted with 200 parts by volume of methanol. The precipitate is filtered at this temperature and vacuum dried at 80°.

A beige-colored compound of formula

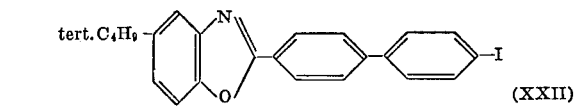

(XXII)

which melts at 209–211° is obtained in a yield of 35 parts (78% of theory).

29.3 parts of the compound of Formula XXII are homogeneously mixed with 14.4 parts of Venus copper and 0.5 part of mercury at room temperature under nitrogen. The dry mixture is raised to 180° with stirring to form a brown melt which is heated further to 230° in the course of 1 hour and maintained at this temperature for 2 hours. It takes on the form of a firmly baked mass, which is cooled to room temperature, crushed in a mortar and entered into hot ortho-dichlorobenzene to remove the soluble by-products. The solid residue is isolated, added to 100 parts by volume of 2-n-nitric acid with stirring for 10 minutes at room temperature, then run into 1000 parts by volume of water. The solid components are filtered with suction, stirred into 500 parts by volume of concentrated ammonia at room temperature and the precipitate is filtered, washed with water until neutral and recrystallized from trichlorobenzene.

The final product, the compound of formula

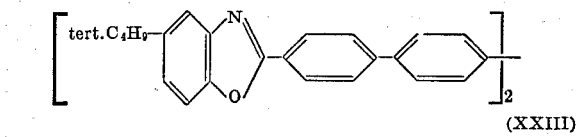

(XXIII)

is obtained in good yield in the form of pale yellow crystals. Its melting point is >370°, the position of maximum absorption in ultra-violet radiation is 350 nm., and its fluoresces with a red-violet shade in chlorobenzene solution.

The compounds specified in the table below can be produced in analogy with the foregoing procedures. They agree with the general formula

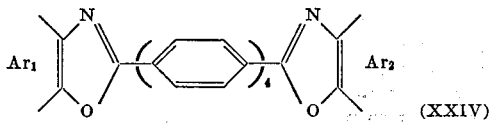

(XXIV)

and are distinguished by the meanings of the symbols

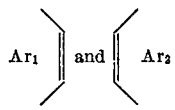

the physical form, melting point and color of fluorescence.

TABLE

| Ex. No. | $Ar_1 \diagdown\!\!\!\diagup^N\!\!\!\diagdown_O\!\!\!\diagup = Ar_2 \diagdown\!\!\!\diagup^N\!\!\!\diagdown_O\!\!\!\diagup$ | Physical form | Melting point, °C. | Fluorescence color |
|---|---|---|---|---|
| 5 | CH₃—⌬—N | Colorless crystals | >360 | Red-violet. |
| 6 | tert.C₄H₉—⌬(tert.C₄H₉)—N | ...do... | 329–331 | Do. |
| 7 | (naphthyl)—N | Yellow crystals | >360 | Blue-violet. |
| 8 | (phenanthryl)—N | ...do... | >360 | Do. |
| 9 | NC—⌬—N | ...do... | >360 | Do. |

APPLICATION EXAMPLE A

A batch of polyamide 6 (poly-ε-caprolactam) granules is powdered in a mixer with 0.01–0.05% of its weight of the compound produced as in Example 4. The batch is transferred to a melt spinning machine, where it is melted under nitrogen for 30 minutes at about 300°, stirred at this temperature for 15 minutes, raised to 285° and spun at this temperature under 3–5 atmospheres excess pressure in monofilament form. In daylight the filament fluoresces with a violet shade. It appears much whiter and brighter than comparable filament without brightener.

If polyester or polypropylene is used instead of polyamide and spun at 290° or 260° respectively, the filaments likewise show a higher degree of whiteness than comparable filament containing no brightener.

In place of the compound of Formula IV, one of those disclosed in Example 2, 3, 5 or 6 or a mixture of these compounds with bluish brighteners can be employed, which again results in excellent white effects. The compounds of Examples 1, 7 and 8 produce white effects of brilliant reddish blue to neutral blue shade in polyester fibers.

APPLICATION EXAMPLE B

In a mixer 100 parts of polypropylene granules are powdered with 0.01 part of the compound of Example 2. After processing on a roller mill the material is either extruded as panelling or regranulated and moulded in the desired form. The molded products show a considerably higher degree of whiteness than comparable unbrightened products. The polypropylene can be replaced by high or low density polyethylene, another polyolefin, polystyrene, polyester or cellulose acetate.

APPLICATION EXAMPLE C 100 parts of molding material consisting of 65 parts of polyvinyl chloride, 35 parts of dioctyl phthalate and 2% (relative to the polymer) of a stabilizer are mixed with 0.005 part of the compound of Example 3 in solution in a plasticizer. The material is worked on a roller mill for 10 minutes at 150–160° and extrusion molded as film. If opaque film is desired 2.5% titanium dioxide is incorporated before processing. The films are superior in appearance to films of the same composition without an incorporated brightener.

APPLICATION EXAMPLE D 100 parts of polyester granules produced from polyterephthalic acid ethylene glycol ester are intimately mixed with 0.01 part of the compound of Example 2. The material is melted at 280–300° and spun in a melt spinning machine. The brightened polyester filament has a pronounced violet fluorescence shade which is outstandingly fast to light.

The compound of Example 2 can be added to the starting materials prior to or during the condensation polymerization reaction giving the final polyester.

Formulae of representative bis-aroxazolyl-para-polyphenylenes of the foregoing examples are as follows:

EXAMPLE 2, LAST PARAGRAPH

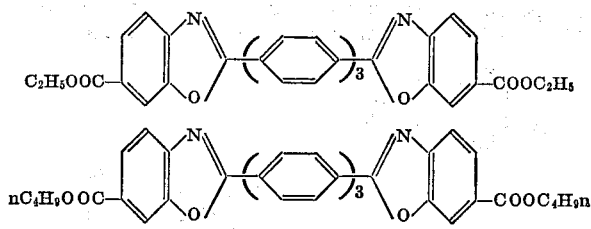

EXAMPLE 5

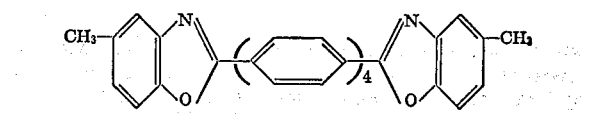

EXAMPLE 8

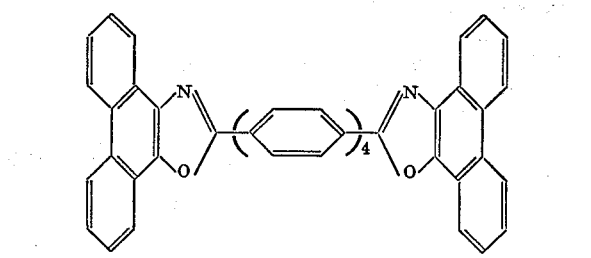

EXAMPLE 9

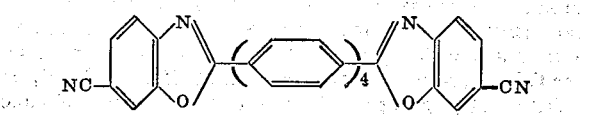

Having thus disclosed the invention what we claim is:
1. A compound of the formula

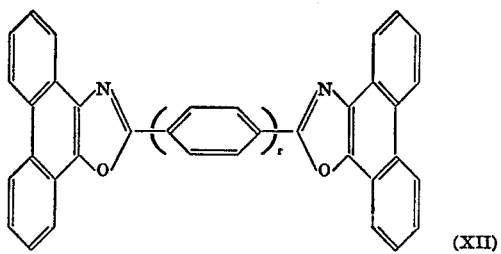

(XII)

where r stands for 3 or 4.

2. The bis-phenanthroxazolyl-para-polyphenylene according to claim 1 and of the formula

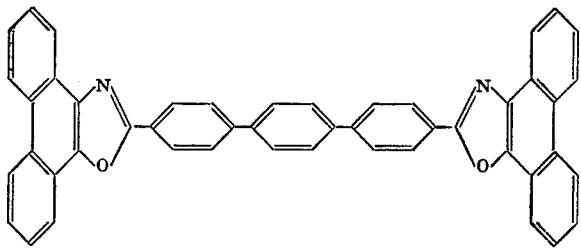

3. The bis-phenanthroxazolyl-para-polyphenylene according to claim 1 and of the formula

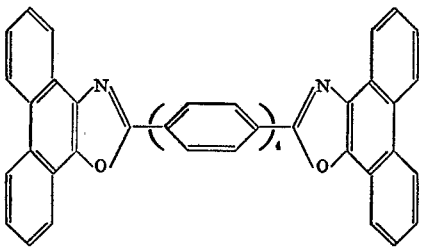

4. A compound of the formula

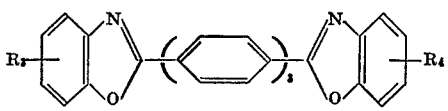

(XIII)

where $R_3$ and $R_4$ each stand for cyano, carboxyl, aminocarbonyl or alkoxycarbonyl with 1 to 4 carbon atoms in the alkoxy portion.

5. The bis-benzoxazolyl-para-polyphenylene according to claim 4 and of the formula

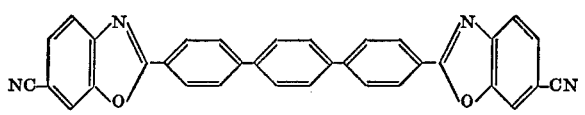

6. The bis-benzoxazolyl-para-polyphenylene according to claim 4 and of the formula

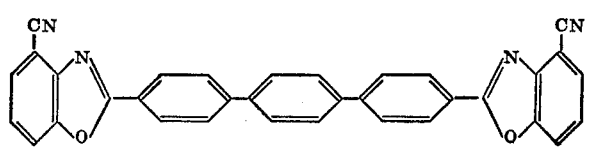

7. The bis-benzoxazolyl-para-polyphenylene according to claim 4 and of the formula

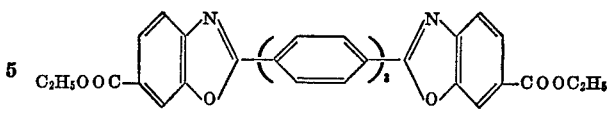

8. A compound of the formula

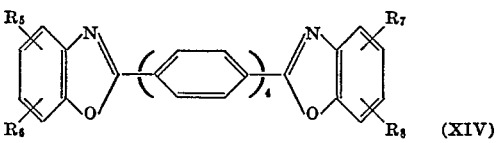

(XIV)

where $R_5$ and $R_7$ each stands for hydrogen alkyl or alkoxy of 1 to 4 carbon atoms, cyano, carboxyl, aminocarbonyl or alkoxycarbonyl having 1 to 4 carbon atoms in the alkoxy portion, and $R_6$ and $R_8$ each for hydrogen or alkyl of 1 to 4 carbon atoms, or $R_5$ and $R_6$ together and $R_7$ and $R_8$ together form a —CH=CH—CH=CH— chain.

9. The bis-benzoxazolyl-para-polyphenylene according to claim 8 and of the formula

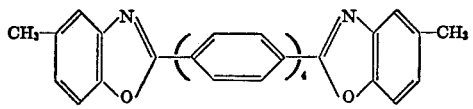

10. The bis-benzoxazolyl-para-polyphenylene according to claim 8 and of the formula

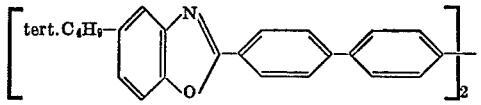

11. The bis-benzoxazolyl-para-polyphenylene according to claim 8 and of the formula

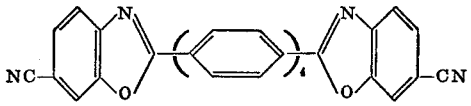

References Cited
UNITED STATES PATENTS

| | | | |
|---|---|---|---|
| 3,314,894 | 4/1967 | Nyilas et al. | 252—301.2 |
| 3,682,946 | 8/1972 | Liechti | 260—307 D |

FOREIGN PATENTS 18,750  6/1970  Japan.

DONALD G. DAUS, Primary Examiner
R. V. RUSH, Assistant Examiner

U.S. Cl. X.R.
252—301.2 W